US005853852A

United States Patent [19]

Eichhorn

[11] Patent Number: 5,853,852

[45] Date of Patent: Dec. 29, 1998

[54] DECORATIVE GLASS SHEET WITH APPLIQUES

[75] Inventor: Keith L. Eichhorn, High Point, N.C.

[73] Assignee: Glass Unlimited of High Point, Inc., High Point, N.C.

[21] Appl. No.: 645,004

[22] Filed: May 9, 1996

[51] Int. Cl.[6] ................................ B32B 3/28; B05D 3/12; E06B 3/66

[52] U.S. Cl. .............................. 428/167; 428/38; 428/79; 428/172; 428/210; 428/542.2; 52/204.59; 156/101; 156/102; 156/257; 427/275; 427/287; 427/290

[58] Field of Search .......................... 428/34, 167, 542.2, 428/38, 79, 172, 195, 210; 156/60, 63, 101, 102, 106, 154, 257; 427/287, 290, 271, 284, 275; 52/204.59, 311.1; 65/102, 106, 60.1, 61

[56] References Cited

U.S. PATENT DOCUMENTS

| | | | |
|---|---|---|---|
| 311,014 | 1/1885 | Koskul | 428/38 |
| 2,769,265 | 11/1956 | Nelson | 41/26 |
| 2,819,195 | 1/1958 | Huber | 154/79 |
| 3,089,800 | 5/1963 | Colfer et al. | 154/46.8 |
| 4,070,781 | 1/1978 | Sauer | 40/219 |
| 4,127,689 | 11/1978 | Holt | 428/38 |
| 4,312,688 | 1/1982 | Brodis et al. | 156/63 |
| 4,335,170 | 6/1982 | Butler | 428/38 |
| 4,488,919 | 12/1984 | Butler | 156/153 |
| 4,495,739 | 1/1985 | Drennan | 428/67 |
| 4,520,053 | 5/1985 | Marentic | 428/31 |
| 4,584,218 | 4/1986 | Travis | 428/40 |
| 4,619,850 | 10/1986 | Charlton | 428/38 |
| 4,989,384 | 2/1991 | Kinghorn et al. | 52/456 |
| 5,021,275 | 6/1991 | Kim | 428/42 |
| 5,078,815 | 1/1992 | Othon | 156/63 |
| 5,267,421 | 12/1993 | Salisbury | 52/314 |

FOREIGN PATENT DOCUMENTS 2 132 675 7/1984 United Kingdom .

*Primary Examiner*—Donald Loney
*Attorney, Agent, or Firm*—Rhodes, Coats & Bennett, L.L.P.

[57] ABSTRACT

A decorative glass sheet including a glass panel having an upper surface and a lower surface. An applique overlies a portion of the upper surface of the glass panel and has a periphery, an upper surface and a lower surface. An adhesive coupler is interposed between the upper surface of the glass panel and the lower surface of the applique. The applique is secured to the glass panel by the adhesive coupler. The decorative glass sheet may also include one or more grooves formed in the glass panel. Further, one or more coatings may be disposed on the surface of the glass panel. Preferably, the applique covers the entirety of the portion of the glass panel underlying the applique.

40 Claims, 4 Drawing Sheets

DECORATIVE GLASS SHEET WITH APPLIQUES

FIELD OF THE INVENTION

The present invention is directed to a decorative glass sheet of the type used for architectural applications and a method for forming the same, and, more particularly, a decorative glass sheet having one or more appliques and/or one or more grooves and coatings suitable for use in architectural applications and a method for forming the same.

BACKGROUND OF THE INVENTION

In recent years, the interior and exterior design of buildings and structures, as well as the furnishings therefor, have employed increasing quantities of decorative glass. For example, it is now commonplace for glass sheets to be used in various types of doors such as shower doors, storm doors, patio doors, entry doors, bi-fold doors, and in decorative windows, mirrors, and other furniture and architectural applications. As the scope of architectural and design tastes expands, the industry has become increasingly receptive to glass sheet products which have unique visual effects.

Several techniques are known and employed to produce unique and desirable decorative glass sheets. For example, a glass panel may be provided with a decorative coating, frosting, or etching. It is also known to provide grooves or bevels in glass panels alone or in combination with the foregoing. Several patented techniques are directed to simulating a stained glass window having lead caming. See, for example, U.S. Pat. No. 4,619,850 to Charlton, U.S. Pat. No. 4,335,170 to Butler, U.S. Pat. No. 4,312,688 to Brodis et al., U.S. Pat. No. 4,127,689 to Holt, and U.S. Pat. No. 4,488,919 to Butler. Typically, the lead caming is simulated by a reticulated metal framework which defines voids between a plurality of metal strips, the voids along with the underlying glass panel simulating individual panes of glass. As disclosed, the metal frameworks are applied to the surface of a flat glass panel or within a groove or grooves formed in a glass panel. It is also known to apply metal foil appliques such as lettering to glass doors and windows.

While the above noted techniques serve their intended purposes, such as simulating stained glass, there exists a need for a more unique decorative glass panel which may include less traditional decorative designs. Further, there exists a need for a technique for forming decorative glass sheets which may be adapted to create a wide variety of aesthetically pleasing designs and which may be combined with numerous known decorative elements.

SUMMARY OF THE INVENTION

The present invention is directed to decorative glass sheets. Each of the decorative glass sheets include a glass panel having an upper surface and a lower surface. An applique overlies a portion of the upper surface of the glass panel and has a periphery, an upper surface and a lower surface. An adhesive coupler is interposed between the upper surface of the glass panel and the lower surface of the applique. The applique is secured to the glass panel by the adhesive coupler.

A decorative glass sheet as described above may include at least one groove formed in the upper surface of the glass panel adjacent the periphery of the applique. The decorative glass sheet may further including at least one second groove formed in the upper surface of the glass panel. The second groove forms an intersection with the first groove with the applique disposed adjacent the intersection. Preferably, the applique is disposed a distance of about 0.125 to 2 inches from each of the first and second grooves.

As an alternative to or in addition to the aforesaid groove or grooves, the decorative glass sheet may include a decorative coating disposed on the upper surface of the glass sheet.

Preferably, the applique covers the entirety of the portion of the glass panel underlying the applique. The adhesive coupler is preferably a double sided tape which extends to the periphery of the applique. More particularly, the tape may include a closed cell foam carrier having an adhesive layer on upper and lower surfaces thereof. Alternatively, the tape may include a gel sealant. The tape is preferably clear.

Preferably, the upper surface of the applique includes a three dimensional design formed therein. The upper surface of the applique may be formed from brass. Further, the upper surface of the applique may be engravable.

A decorative glass sheet as described above may further include a second applique substantially identical to the first applique secured by a second adhesive coupler to the lower surface of the glass panel.

More particularly and in one embodiment, the present invention is directed to a decorative glass sheet including a glass panel having an upper surface and a lower surface and a first applique overlying a portion of the upper surface of the glass panel. The first applique has a periphery, an upper surface and a lower surface, the upper surface including a three dimensional design formed therein. A first double sided tape is interposed between the upper surface of the glass panel and the lower surface of the applique, whereby the applique is secured to the glass panel by the first double sided tape. A second applique substantially identical to the first applique is secured by a second double sided tape to the lower surface of the glass panel. At least one first groove and at least one second groove are formed in the upper surface of the glass panel, the at least one first groove and the at least one second groove forming an intersection. Preferably, the applique is disposed a distance of about 0.125 to 2 inches from each of the first and second grooves. The first applique is disposed adjacent the intersection. The first applique covers the entirety of the portion of the glass panel underlying the first applique.

The decorative glass sheet just described may further include a coating disposed on at least one of the upper surface and the lower surface of the glass panel. The first and second double sided tapes may be clear. Preferably, the first and second double sided tapes extend to the peripheries of the first and second appliques, respectively.

The present invention is further directed to a method for forming a decorative glass sheet using a glass panel. At least one groove is formed in the glass panel. An applique is secured to an upper surface of the glass panel adjacent the groove by means of an adhesive coupler.

The step of forming at least one groove may include forming at least one first groove and at least one second groove such that the at least one first groove and the at least one second groove form an intersection. The step of applying the applique may include applying the applique adjacent the intersection. The method described may further include the step of securing a second applique substantially identical to the first applique to a lower surface of the glass panel by means of a second adhesive coupler. A coating may be applied to the upper surface of the glass panel.

An object of the present invention is to provide a particularly unique decorative glass sheet.

Moreover, an object of the present invention is to provide such a decorative glass sheet which may include a variety of traditional and non-traditional decorative designs.

Yet another object of the present invention is to provide such a decorative glass sheet which may be adapted to include a wide variety of aesthetically pleasing designs and which may include numerous known decorative elements.

The preceding and further objects of the present invention will be appreciated by those of ordinary skill in the art from a reading of the figures and the detailed description of the preferred embodiment which follow, such description being merely illustrative of the present invention.

DETAILED DESCRIPTION OF THE PREFERRED EMBODIMENT

With reference to the figures, decorative glass sheets 10, 100, 200, and 300 each include a glass panel having an applique secured to at least an upper surface thereof. The respective appliques are integral to overall visual designs which include grooves, inlaid strips, and/or opaque or translucent coatings. The appliques, in contrast to the reticulated caming simulating frameworks of the prior art, each cover the entire area of the glass panel underlying the applique within the periphery of the applique. That is, the appliques do not include holes or voids through which the glass panel is exposed. The uniquely designed appliques in combination with the glass panel, and further in combination with various other design elements provide a unique and desirable appearance while allowing great versatility in designing such decorative glass sheets.

Figure 1:
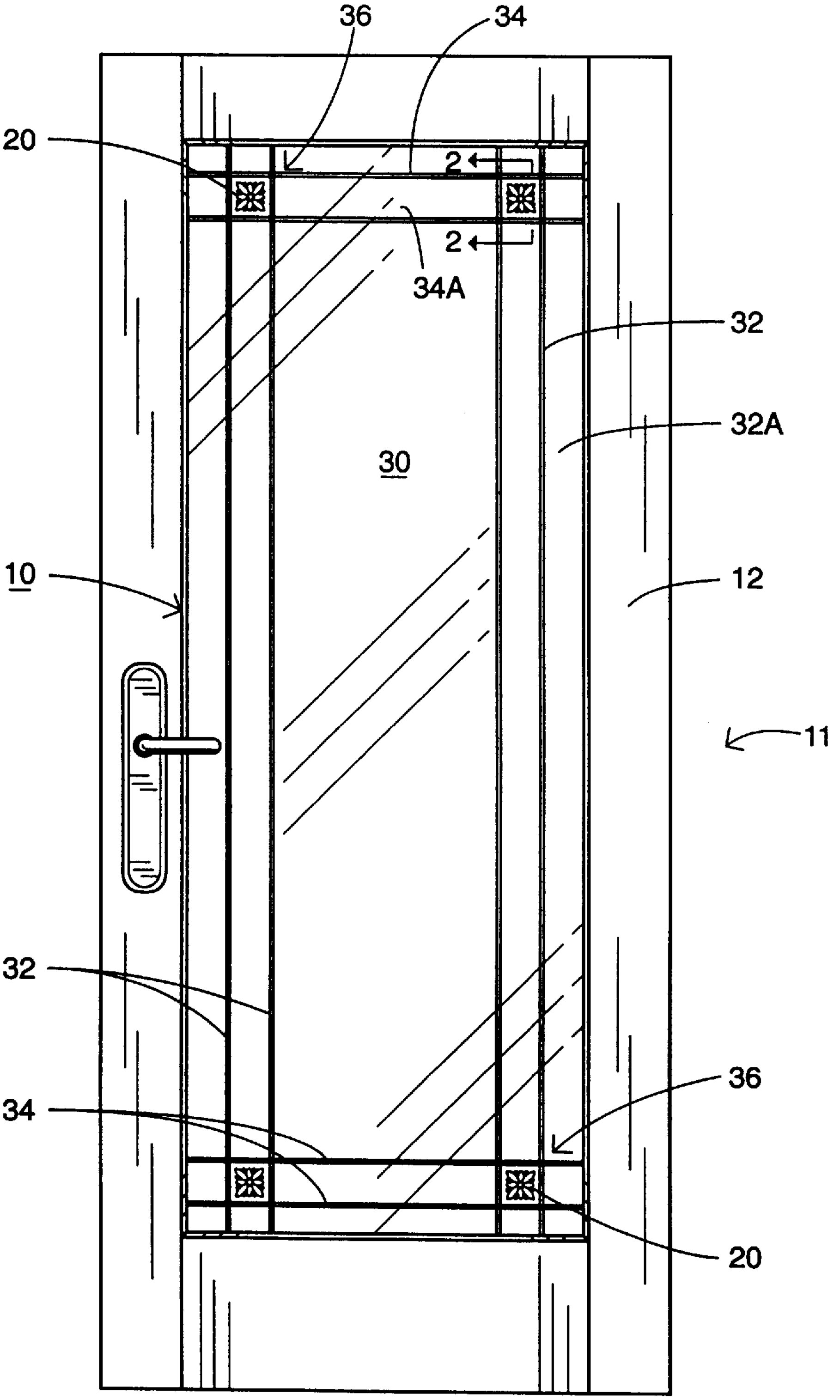
FIG. 1 is a front plan view of a door incorporating a decorative glass sheet according to a first embodiment of the present invention.
Figure 2:
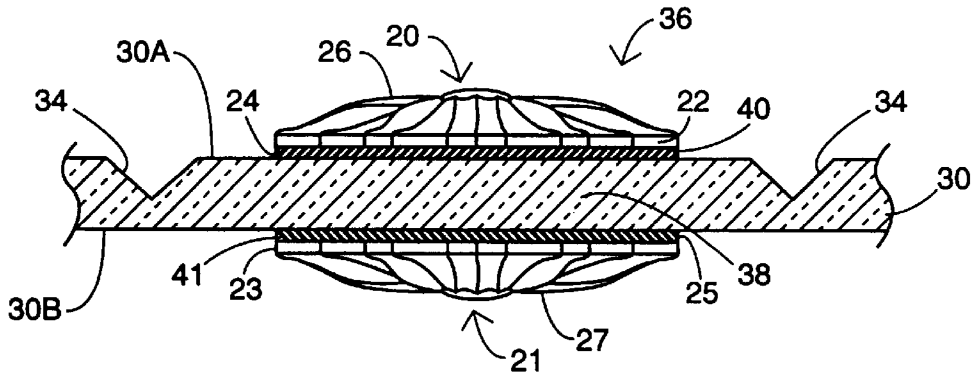
FIG. 2 is a side, fragmentary, cross-sectional view of the decorative glass sheet of FIG. 1 taken along the line 2—2.

A first embodiment according to the present invention is shown in FIGS. 1 and 2 as applied to an interior or exterior door 11. Door 11 includes frame 12 into which decorative glass sheet 10 is fitted in conventional fashion. Decorative glass sheet 10 includes glass panel 30 having upper surface 30A and lower surface 30B. Glass panel 30 is preferably tempered and has a thickness of from about 2.5 mm to about 6.0 mm.

Grooves 32, 34 are formed in upper surface 30A of the glass panel. Grooves 32, 34 preferably have a depth of from about 0.3 mm to about 2.5 mm and a width of from about 5 mm to about 20 mm. Vertical, parallel grooves 32 define vertical bands 32A therebetween, each preferably having a uniform width of from about 25 mm to about 77 mm. Horizontal, parallel grooves 34 define horizontal bands 34A therebetween, each preferably having a uniform width of from about 25 mm to about 77 mm. The intersections of bands 32A and 34A each define a preferably square area 36 surrounded by grooves 32, 34.

As best seen in FIG. 2, appliques 20 are secured by means of double sided tape 40 to the upper surface 30A of glass panel 30 in intersection areas 36. Preferably, the peripheries of the appliques are spaced from about 0.125 to 2 inches from each of the respective adjacent grooves so that the grooves serve to frame the surrounded appliques. Each applique 20 has ornamental upper surface 26, lower surface 24, and an outer periphery 22. Upper surface 26 is preferably topographic, i.e., is three dimensional such that it presents an image selectively raised from the glass. Applique 20 is preferably formed from brass or includes a brass coating on its upper surface, the remainder formed of zinc or the like. Applique 20 may be solid or may be hollowed on its underside.

Double sided tape 40 adheres to the lower surface 24 of applique 20 and includes a substrate having adhesive on opposed sides thereof. Tape 40 is preferably a closed cell foam, coated on two surfaces with exterior grade adhesive or, alternatively, a clear gel sealant without a foam carrier. Further, tape 40 is preferably clear. Suitable double sided tapes include 3M product numbers 4929 (black, closed cell foam), 4905 (clear, sealant without carrier), and 4910 (clear, sealant without carrier). Preferably, the upper surface of the glass is pretreated with a silane preparation such as Dow Corning product number Z6040.

Preferably, tape 40 covers the entire lower surface 24 of applique 20 such that the tape extends to the periphery of the applique. However, the tape may be of a smaller area than the applique with the entirety of the tape patch being disposed within and spaced from the periphery of the applique. If the applique is hollowed on its underside, one or more additional patches of double sided tape are preferably adhered within the hollow to bridge the gap between the lower surface of the applique and the tape 40 in contact with the glass panel surface. Alternatively, the hollow may be filled with a filler material such as silicone, butyl, or zinc (during the forming process).

While double sided tape as discussed above is preferred, other types of adhesives may be used to secure the appliques to the glass panel. Suitable adhesives include silicone sealers or butyl.

As shown in FIG. 2, a second applique 41 is secured to lower surface 30B of glass panel 30 by means of double sided tape 41. Applique 21 is preferably substantially identical to applique 20 and includes outer periphery 23, lower surface 25, and upper surface 27, corresponding to elements 22, 24, and 26 of applique 20, respectively.

Alternatively, the second applique 41 may be omitted such that only appliques 20 are provided. In this configuration, tape 40 or a substitute adhesive layer is preferably clear and the lower surface is preferably brass as well so that the applique will provide a desirable decorative appearance from both sides of the decorative glass sheet 10, albeit only three dimensional from the front. It will be appreciated that this modified embodiment significantly reduces the number of appliques required as well as the time and expense required to apply the appliques 41 to the lower surface.

Notably, each of appliques 20, 21 covers the entire area 38 of the glass panel underlying the area defined within its respective outer periphery 22, 23. That is, when viewed from the front or rear sides of the decorative glass sheet, there are no holes or voids formed through the applique through which the underlying glass is exposed. If appliques 21 are omitted, no glass will be exposed to the front. It is also contemplated that a limited number and amount of apertures or perforations may be formed throughout the appliques, however, the total area of such apertures should not make up more than 5% of the total area defined within the periphery of the applique.

Figure 3:
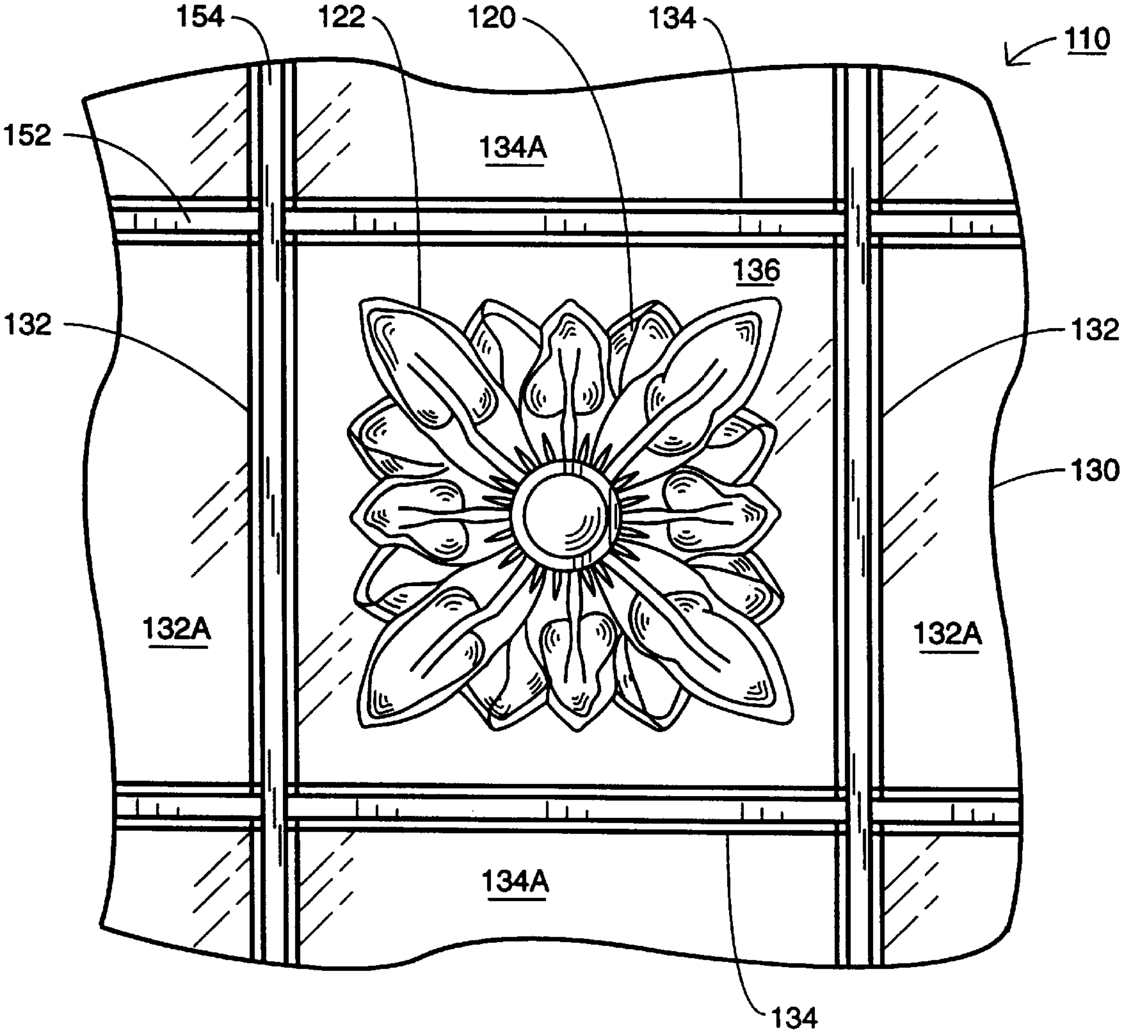
FIG. 3 is a fragmentary front plan view of a decorative glass sheet according to a second embodiment.

With reference to FIG. 3, a fragmentary view of a decorative glass sheet 110 according to a second embodiment of the present invention is shown therein. Decorative glass sheet 110 may be adapted to have an overall design similar to that of FIG. 1. Decorative glass sheet 110 includes glass panel 130 corresponding to glass panel 30 of the first embodiment having vertical, parallel grooves 132 and horizontal, parallel grooves 134, corresponding to grooves 32, 34, formed in the upper surface of the glass panel. Grooves 132, 134 define bands 132A, 134A corresponding to bands 32A, 34A. Bands 132A, 134A define an intersection area 136 corresponding to intersection areas 36. An applique 120 having an outer periphery 122 is secured within each intersection area 136 as discussed with regard to appliques 20. Decorative glass sheet 110 differs from decorative glass sheet 10 in the provision of inlaid bands 152 and 154 secured within grooves 132 and 134, respectively. Bands 152, 154 are preferably formed of brass or a flexible material coated with brass. Bands 152, 154 may be adhered to the glass panel 130 by means of double sided tape as discussed above (not shown) or other suitable adhesive.

Figure 4:
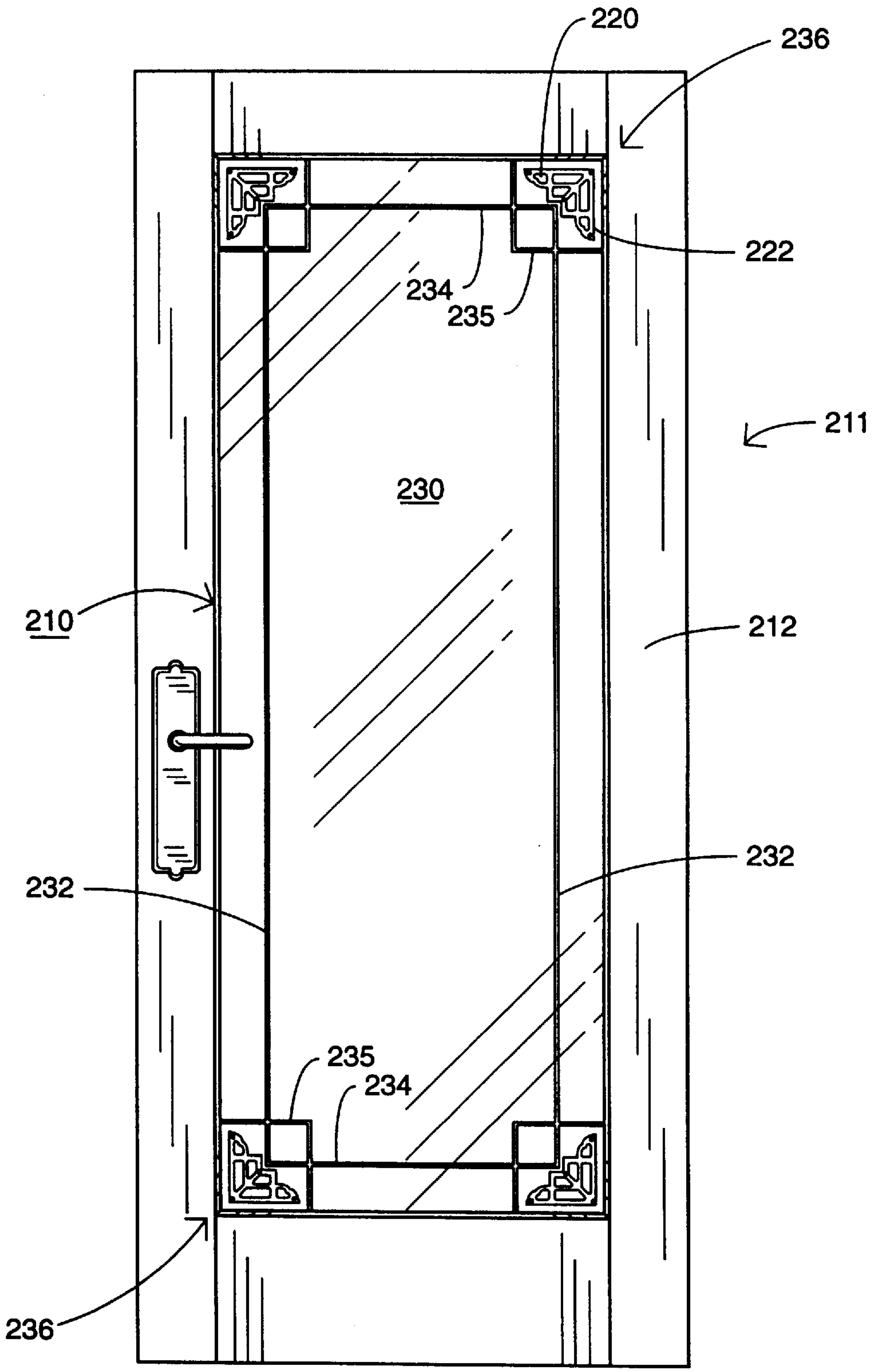
FIG. 4 is a front plan view of a door incorporating a decorative glass sheet according to a third embodiment.

With reference to FIG. 4, a door 211 incorporating a decorative glass sheet 210 according to a third embodiment of the present invention is shown therein. Decorative glass sheet 210 is mounted in door frame 212 in conventional fashion. Decorative glass sheet 210 includes glass panel 230 having vertical, parallel grooves 232 and horizontal, parallel grooves 234 formed in the front or upper surface thereof. Also formed in glass panel 230 are L-shaped grooves 235 which, together with the corners of door frame 212, form square shaped comer areas 236. Triangular or L-shaped appliques 220 are secured to the upper surface of glass panel 230 within areas 236. Each applique 220 has an outer periphery 222. As discussed with regard to appliques 20, appliques 220 preferably cover the entire area of glass panel 230 underlying the area defined by periphery 222 of the applique.

Figure 5:
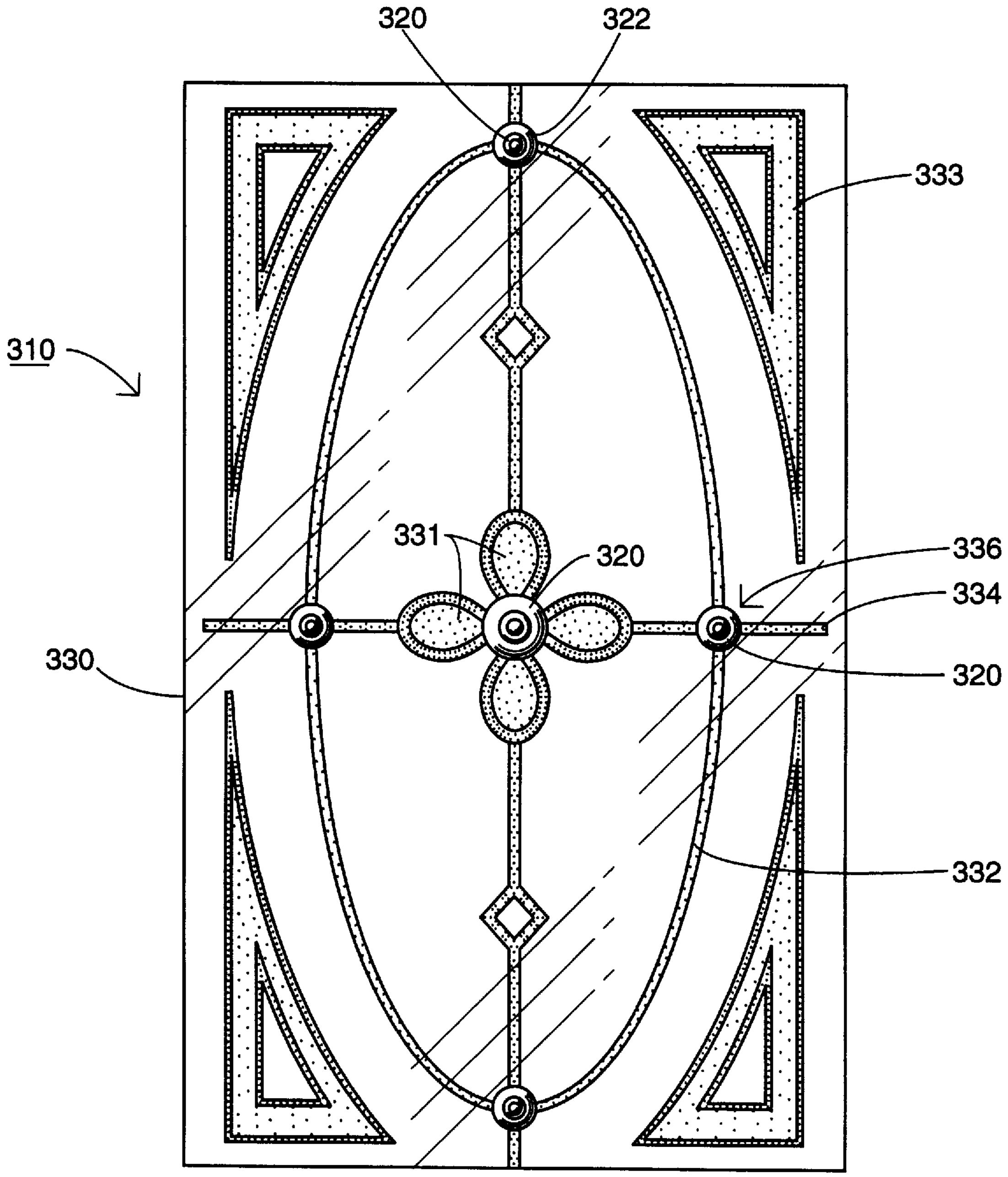
FIG. 5 is a front plan view of a decorative glass sheet according to a fourth embodiment.

With reference to FIG. 5, a decorative glass sheet 310 according to a fourth embodiment of the present invention is shown therein. Decorative glass sheet 310 includes glass panel 330 which is selectively coated on its upper surface with vertical bands 332, horizontal bands 334, and areas 331, 333. Areas 331, 333 may include a dense border coating with a less dense coated area inside the border, as shown. Appliques 320 having outer peripheries 332 are secured at intersections 336 of bands 332 and 334. Appliques 320 may be of the type and may be secured in the same manner as discussed above with regard to appliques 20, 120, and 220. Coatings 332, 334, and 333 may be, for example, fired, ceramic frit, UV curable, and/or air dry inks such as epoxy or lacquer. Alternatively, the coatings may be replaced with frosting or etching.

Each of the above described decorative glass sheets may be formed according to the following method. The glass panel is grooved and/or coated in any suitable manner. The appliques are secured to the upper and/or lower surfaces of the glass panel by the double sided tape or other suitable adhesive. If a double sided tape is used, the tape is preferably first adhered to the lower surface of the applique and then to the appropriate surface of the glass panel. If it is desired to provide a tempered decorative glass sheet, the glass panel is preferably tempered prior to application of the appliques.

While a preferred embodiment of the present invention has been described, it will be appreciated by those of skill in the art that certain modifications may be made without departing from the scope of the present invention. For example, the glass panels may be replaced with mirror panels. The primary decorated surface may be the third surface (i.e., within the air space) on an insulated glass unit. The appliques may be of various sizes, shapes, and styles, not limited to those described and shown herein. All such modifications are intended to come within the scope of the claims which follow.

What is claimed is:

1. A decorative glass sheet, comprising:

a) a glass panel having an upper surface and a lower surface;

b) an applique overlying a portion of said upper surface of said glass panel and having a periphery, an upper surface and a lower surface;

c) an adhesive coupler interposed between said upper surface of said glass panel and said lower surface of said applique, whereby said applique is secured to said glass panel by said adhesive coupler; and d) at least one groove formed in said upper surface of said glass panel adjacent said periphery of said applique.

2. The decorative glass sheet of claim 1 wherein said applique covers the entirety of said portion of said glass panel underlying said applique.

3. The decorative glass sheet of claim 2 wherein said adhesive coupler is a double sided tape.

4. The decorative glass sheet of claim 3 wherein said tape extends to said periphery of said applique.

5. The decorative glass sheet of claim 3 wherein said tape comprises a closed cell foam carrier having adhesive layers on upper and lower surfaces thereof.

6. The decorative glass sheet of claim 3 wherein said tape comprises a gel sealant.

7. The decorative glass sheet of claim 3 wherein said tape is clear.

8. The decorative glass sheet of claim 2 wherein said upper surface of said applique includes a three dimensional design formed therein.

9. The decorative glass sheet of claim 2 wherein said upper surface of said applique is formed from brass.

10. The decorative glass sheet of claim 2 wherein said upper surface of said applique is engravable.

11. The decorative glass sheet of claim 2 further including a second applique substantially identical to said first applique secured by a second adhesive coupler to said lower surface of said glass panel.

12. The decorative glass sheet of claim 1 further including at least one second groove formed in said upper surface of said glass panel and forming an intersection with said at least one first groove, and wherein said applique is disposed adjacent said intersection.

13. The decorative glass sheet of claim 12 wherein said applique is disposed a distance of about 0.125 to 2 inches from each of said first and second grooves.

14. A decorative glass sheet, comprising:

a) a glass panel having an upper surface and a lower surface;

b) an applique overlying a portion of said glass panel and having a periphery, an upper surface and a lower surface;

c) an adhesive coupler interposed between said upper surface of said glass panel and said lower surface of said applique, whereby said applique is secured to said glass panel by said adhesive coupler;

d) at least one groove formed in said upper surface of said glass panel adjacent said periphery of said applique; and e) a decorative coating disposed on said upper surface of said glass panel.

15. The decorative glass sheet of claim 14 wherein said applique covers the entirety of said portion of said glass panel underlying said applique.

16. The decorative glass sheet of claim 15 wherein said adhesive coupler is a double sided tape.

17. The decorative glass sheet of claim 16 wherein said tape extends to said periphery of said applique.

18. The decorative glass sheet of claim 16 wherein said tape comprises a closed cell foam carrier having adhesive layers on upper and lower surfaces thereof.

19. The decorative glass sheet of claim 16 wherein said tape comprises a gel sealant.

20. The decorative glass sheet of claim 16 wherein said tape is clear.

21. The decorative glass sheet of claim 15 wherein said upper surface of said applique includes a three dimensional design formed therein.

22. The decorative glass sheet of claim 15 wherein said upper surface of said applique is formed from brass.

23. The decorative glass sheet of claim 15 wherein said upper surface of said applique is engravable.

24. The decorative glass sheet of claim 15 further including a second applique substantially identical to said first applique secured by a second adhesive coupler to said lower surface of said glass panel.

25. The decorative glass sheet of claim 14 further including at least one second groove formed in said upper surface of said glass panel and forming an intersection with said at least one first groove, and wherein said applique is disposed adjacent said intersection.

26. The decorative glass sheet of claim 25 wherein said applique is disposed a distance of about 0.125 to 2 inches from each of said first and second appliques.

27. A decorative glass sheet, comprising:

a) a glass panel having an upper surface and a lower surface;

b) a first applique overlying a portion of said upper surface of said glass panel and having a periphery, an upper surface and a lower surface, said upper surface including a three dimensional design formed therein;

c) a first double sided tape interposed between said upper surface of said glass panel and said lower surface of said applique, whereby said applique is secured to said glass panel by said first double sided tape;

d) a second applique substantially identical to said first applique secured by a second double sided tape to said lower surface of said glass panel;

e) at least one first groove and at least one second groove formed in said upper surface of said glass panel, said at least one first groove and said at least one second groove forming an intersection, and wherein said first applique is disposed adjacent said intersection; and f) wherein said first applique covers the entirety of said portion of said glass panel underlying said first applique.

28. The decorative glass sheet of claim 27 further including a coating disposed on at least one of said upper surface and said lower surface of said glass panel.

29. The decorative glass sheet of claim 27 wherein said first and second double sided tapes are clear.

30. The decorative glass sheet of claim 27 wherein said first and second double sided tapes extend to said peripheries of said first and second appliques, respectively.

31. The decorative glass sheet of claim 27 wherein said first applique is disposed a distance of about 0.125 to 2 inches from each of said first and second grooves.

32. A method for forming a decorative glass sheet using a glass panel, comprising the steps of:

a) forming at least one groove in the glass panel; and b) securing an applique to an upper surface of the glass panel adjacent the groove by means of an adhesive coupler.

33. The method of claim 32 wherein said step of forming at least one groove includes forming at least one first groove and at least one second groove such that the at least one first groove and the at least one second groove form an intersection, and wherein said step of applying the applique includes applying the applique adjacent the intersection.

34. The method of claim 32 further including the step of securing a second applique substantially identical to the first applique to a lower surface of the glass panel by means of a second adhesive coupler.

35. The method of claim 32 further including the step of applying a coating to the upper surface of the glass panel.

36. A decorative glass panel having an upper surface and a lower surface comprising:

(a) a symmetrical pattern of grooves formed in the upper surface;

(b) at least one upper surface applique overlying a portion of the upper surface and framed by the grooves to form a decorative pattern wherein the applique covers the entirety of the overlaid portion of the upper surface; and a first adhesive coupler positioned between the upper surface and the applique for securing the applique to the upper surface, the adhesive coupler comprised of a double sided tape extending to the periphery of the applique.

37. The decorative glass panel of claim 36 wherein the symmetrical pattern of grooves is formed by a combination of horizontal and vertical grooves.

38. The decorative glass panel of claim 36 further comprising a plurality of decorative bands formed on the upper surface adjacent the pattern of grooves.

39. The decorative glass panel of claim 36 further comprising at least one lower surface applique secured to the lower surface by a second adhesive coupler and positioned in registration with the upper surface applique.

40. The decorative glass panel of claim 36 wherein the first and second adhesive couplers are gel sealants.

* * * * *